(12) United States Patent
Kim et al.

(10) Patent No.: US 11,283,957 B2
(45) Date of Patent: Mar. 22, 2022

(54) MANAGE AND PERFORM JOB BASED ON BLOCKCHAIN IN IMAGE FORMING DEVICE

(71) Applicant: Hewlett-Packard Development Company, L.P., Spring, TX (US)

(72) Inventors: Sejong Kim, Seongnam-si (KR); Hyun-woo Yoo, Seongnam-si (KR); Min Namgoong, Seongnam-si (KR); Jung-Hun Kim, Seongnam-si (KR); Hyeonin Jeong, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/260,348

(22) PCT Filed: Jul. 9, 2019

(86) PCT No.: PCT/US2019/040954
§ 371 (c)(1),
(2) Date: Jan. 14, 2021

(87) PCT Pub. No.: WO2020/146009
PCT Pub. Date: Jul. 16, 2020

(65) Prior Publication Data
US 2021/0297550 A1    Sep. 23, 2021

(30) Foreign Application Priority Data
Jan. 10, 2019    (KR) .......................... 10-2019-0003394

(51) Int. Cl.
*H04N 1/00*    (2006.01)
*G06F 21/31*    (2013.01)
(Continued)

(52) U.S. Cl.
CPC ..... *H04N 1/00954* (2013.01); *G06F 16/2379* (2019.01); *G06F 21/31* (2013.01);
(Continued)

(58) Field of Classification Search
CPC .......... H04N 1/00954; H04N 1/00957; H04N 1/4413; H04N 1/4433; H04N 2201/0094;
(Continued)

(56) References Cited

U.S. PATENT DOCUMENTS 10,558,457 B1 * 2/2020 Kolb ........................ G06F 8/71
2013/0308156 A1   11/2013 Kakutani
(Continued)

FOREIGN PATENT DOCUMENTS

EP    2 256 632 A1    12/2010
JP    2018-516030 A    6/2018
(Continued)

*Primary Examiner* — Juan M Guillermety
(74) *Attorney, Agent, or Firm* — Jefferson IP Law, LLP

(57) ABSTRACT

An image forming device and an operating method of an image forming device are provided. The operating method includes receiving first authentication information corresponding to an account of a first user, when the account of the first user is authenticated according to the first authentication information, preparing an operation of the image forming device according to usage authorization of the first user; receiving a request to provide job information of the first user, obtaining a first job list of the first user from a ledger on which job information of a user with respect to a certain image forming job is recorded, based on a blockchain in which the ledger is distributed and managed, and performing a first image forming job selected from the first job list.

15 Claims, 10 Drawing Sheets

(51) Int. Cl.
*G06F 16/23* (2019.01)
*H04N 1/44* (2006.01)
*H04L 9/06* (2006.01)

(52) U.S. Cl.
CPC ....... *H04N 1/00957* (2013.01); *H04N 1/4413* (2013.01); *H04N 1/4433* (2013.01); *H04L 9/0643* (2013.01); *H04L 2209/38* (2013.01); *H04N 2201/0094* (2013.01)

(58) Field of Classification Search
CPC .... H04N 1/44; H04N 1/4426; G06F 16/2379; G06F 21/31; G06F 3/12; G06F 16/00; G06F 3/1238; G06F 3/1262; H04L 9/0643; H04L 2209/38; H04L 29/08; H04L 67/1046; H04L 67/1065
See application file for complete search history.

(56) References Cited

U.S. PATENT DOCUMENTS

| | | |
|---|---|---|
| 2016/0212297 A1 | 7/2016 | Nagasawa |
| 2017/0279783 A1 | 9/2017 | Milazzo et al. |
| 2017/0329996 A1 | 11/2017 | Wilson |
| 2018/0094953 A1 | 4/2018 | Colson et al. |
| 2019/0180291 A1* | 6/2019 | Schmeling ............. G16H 20/10 |

FOREIGN PATENT DOCUMENTS

| | | |
|---|---|---|
| WO | WO-2018/100227 A1 | 6/2018 |
| WO | WO-2018/190809 A1 | 10/2018 |

\* cited by examiner

MANAGE AND PERFORM JOB BASED ON BLOCKCHAIN IN IMAGE FORMING DEVICE

BACKGROUND

An image forming device may perform a certain image forming job according to a command of a user. For example, the image forming device may receive a command for performing the certain image forming job from an electronic device of the user and perform the certain image forming job. Also, the image forming job may output an output of a certain file according to an output command of the certain file stored in the image forming device.

BRIEF DESCRIPTION OF DRAWINGS

Examples of the disclosure will be more apparent from the following description taken in conjunction with the accompanying drawings, in which.

DETAILED DESCRIPTION OF EXAMPLES

The term "image forming device" may refer to any type of device capable of performing an image forming job, such as a printer, a copier, a scanner, a fax machine, a multi-function printer (MFP), a display device, or the like. The term "image forming job" may refer to a job, such as a printing job, a copying job, a scanning job, or a faxing job. The term "blockchain" may denote a distributed peer-to-peer (P2P) system of a ledger using a software element consisting of an algorithm in which blocks connected according to an order negotiate, by using an encryption technique and a security technology, job information regarding a certain image forming job, so as to secure and maintain integrity. Also, the term "blockchain" may denote a distributed ledger technology in which a ledger in which job information is recorded is distributed in a P2P network instead of a central server of a specific organization and is commonly recorded and managed by nodes in the P2P network.

The term "node" may denote an element in a network of a blockchain. For example, a node may be an image forming device, a network attached storage (NAS), a server, or the like.

The term "authentication information" may refer to information for identifying a user when the user uses an image forming device. For example, the authentication information may include an identification (ID) of a user, a name of the user, a password, an email address, a phone number, an address, an authorization ID mapped to the ID of the user, an authentication certificate, or the like. Also, the authentication information may include information for identifying the user, such as a fingerprint, a voice, an iris, or the like of the user.

Hereinafter, one or more examples of the disclosure will be described with reference to accompanying drawings to be easily executed by one of ordinary skill in the art. However, the disclosure may be embodied in many different forms and is not limited by examples described herein.

Figure 1:
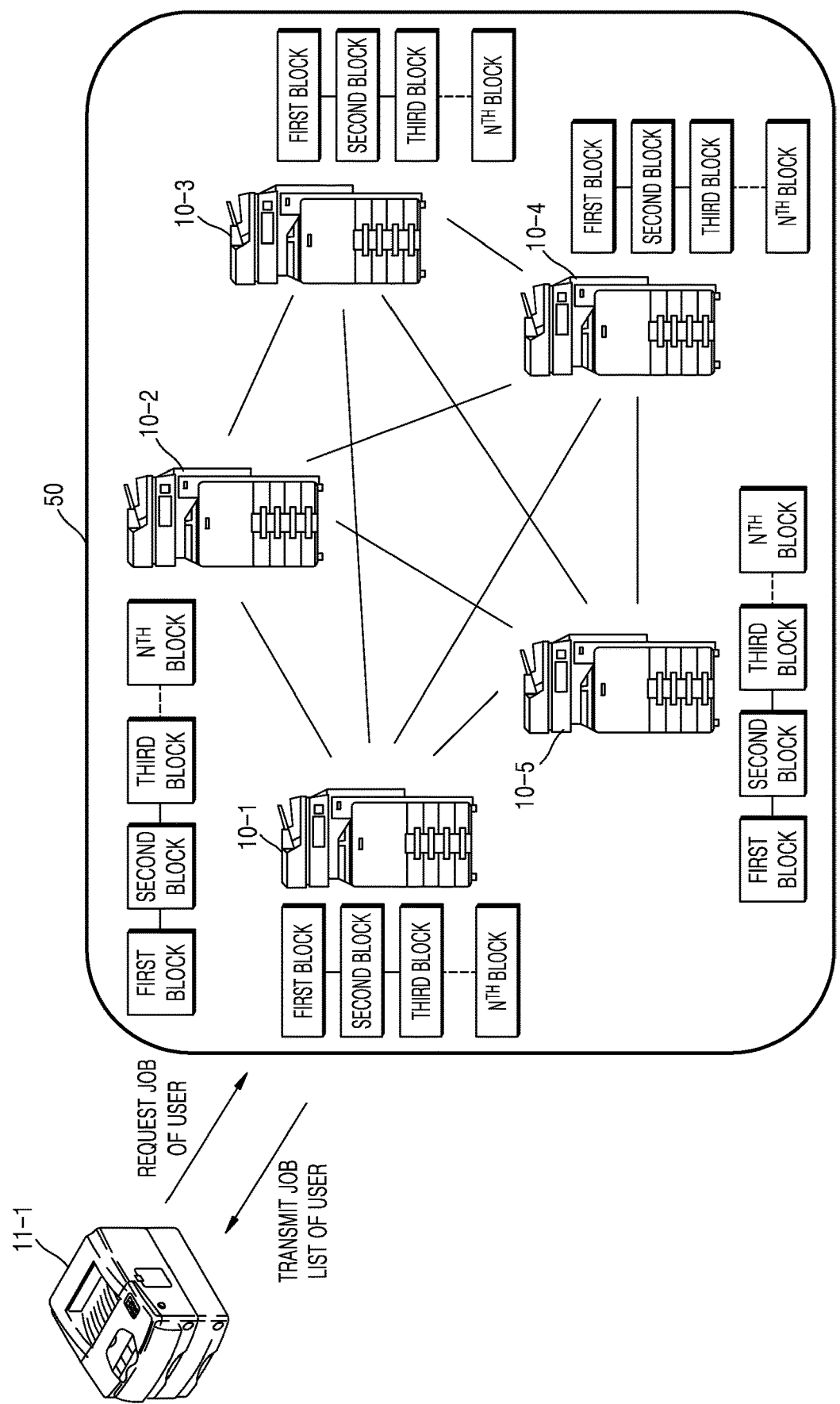
FIG. 1 is a conceptual diagram for describing operations between a plurality of nodes managing a ledger in which job information of a user is recorded, based on a blockchain, according to an example.

FIG. 1 is a conceptual diagram for describing operations between a plurality of nodes managing a ledger in which job information of a user is recorded, based on a blockchain, according to an example.

Referring to FIG. 1, the plurality of nodes may manage the job information of the user with respect to a certain image forming job, based on the blockchain. The plurality of nodes may include an image forming device or a certain device capable of storing the job information of the user. Here, the plurality of nodes may include a first image forming device 10-1, a second image forming device 10-2, a third image forming device 10-3, a fourth image forming device 10-4, and a fifth image forming device 10-5.

For example, a first user may access a first image forming device 10-1 among the plurality of nodes by using an account of the first user. Each of the plurality of nodes may possess a ledger in which the job information of the user with respect to the image forming job is recorded. Information recorded in the ledgers possessed by the plurality of nodes may be the same. Job information related to jobs stored in certain nodes by a plurality of users may be recorded in the ledger. For example, the job information may include information of at least one of an ID of a job, a name of the job, a location of a node where a file related to the job is stored, a storage deadline, or the like.

When the first user requests the first image forming device 10-1 to generate a first job list, the first image forming device 10-1 may obtain job information of the first user from the ledger and generate the first job list. The first job list may include information about jobs stored via the second through fifth image forming devices 10-2 through 10-5. In other words, the first user may identify the jobs of the first user stored via the second through fifth image forming devices 10-2 through 10-5, through the first job list. For example, the first user may select a certain file stored in the second image forming device 10-2 from the first job list and request output of the certain file. The first image forming device 10-1 may output the certain file.

Also, when data related to the certain job of the first user is stored in the first image forming device 10-1, the first image forming device 10-1 may record job information of the certain job in the ledger.

Also, the first image forming device 10-1 may receive a request to provide job information of a certain user from an external image forming device 11-1 in a network 50 of the blockchain. The first image forming device 10-1 may obtain job information of the certain user from the ledger and generate a job list of the certain user. The first image forming device 10-1 may transmit the job list of the certain user to the external image forming device 11-1.

Figure 2:
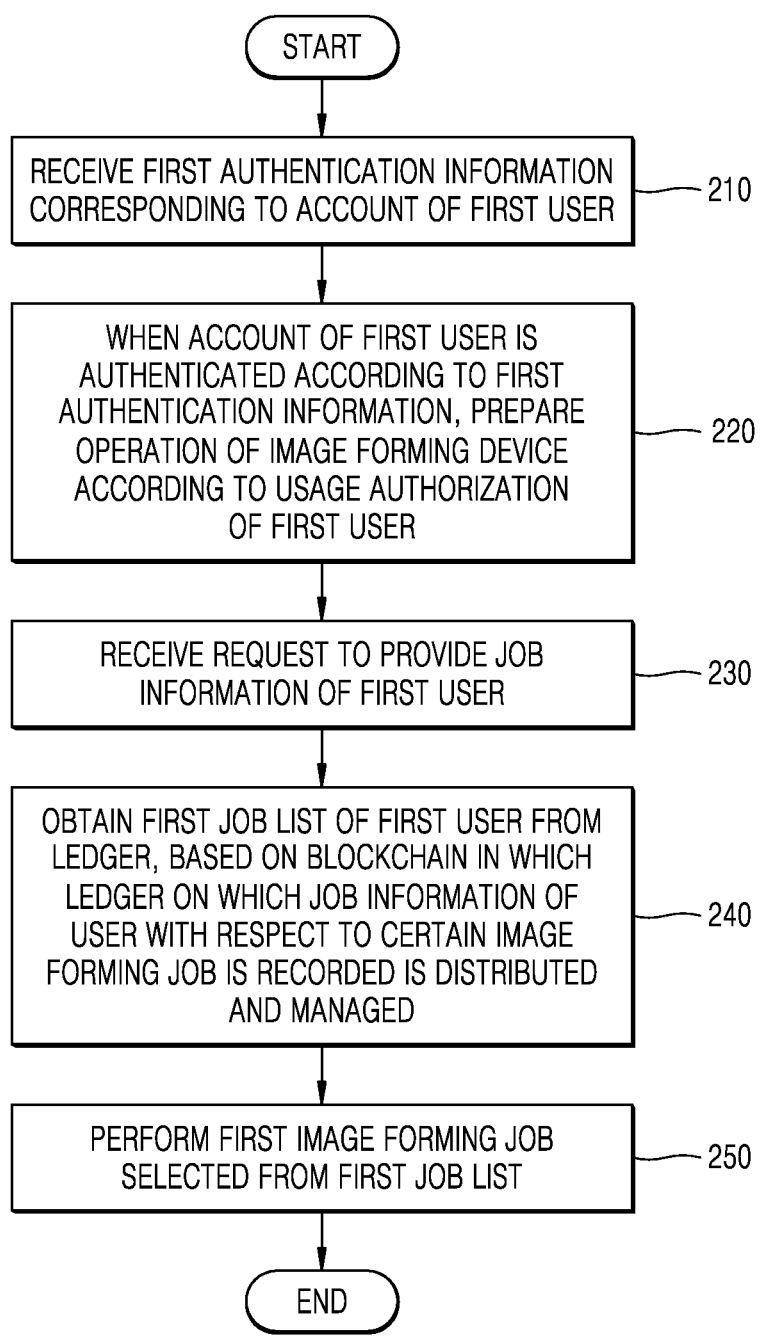
FIG. 2 is a flowchart of an operating method of an image forming device, according to an example.

FIG. 2 is a flowchart of an operating method of an image forming device, according to an example.

Referring to FIG. 2, the image forming device may receive first authentication information corresponding to the account of the first user in operation 210. For example, the image forming device may receive ID information of the first user and password information with respect to the ID information of the first user, through a user interface device.

In operation 220, when the account of the first user is authenticated according to the first authentication information, the image forming device may prepare an operation of the image forming device according to usage authorization of the first user.

In operation 230, the image forming device may receive a request to provide job information of the first user. For example, the image forming device may receive an input of requesting to provide the job information of the first user recorded in the ledger of the blockchain through the user interface device.

In operation 240, the image forming device may obtain a first job list of the first user from the ledger, based on the blockchain in which a ledger in which job information of a user with respect to a certain image forming job is recorded is distributed and managed.

As an example, the image forming device may obtain the job information of the first user from the ledger. The image forming device may identify operation states of nodes storing data related to the job information of the first user, from among nodes in a network of the blockchain. For example, the image forming device may transmit a certain signal to the nodes. Upon receiving a response signal with respect to the certain signal from a second node, the image forming device may determine that the second node is in a power-on state. On the other hand, when the response signal with respect to the certain signal is not received from the second node, the image forming device may determine that the second node is in a power-off state. The image forming device may generate the first job list indicating a list of activated jobs, based on a result of the identification. Also, the first job list may include a list of deactivated jobs. Because the first job list is generated based on job information recorded in the ledger, the first user may identify the job information of the first user regardless of activation of the node related to the certain job information. Also, the first user may identify a location of a node where a file related to a certain job is stored and an operation state of the node through the first job list.

For example, the image forming device may determine a job stored in the node in the power-on state among the nodes as an activated job. The image forming device may determine a job stored in the node in the power-off state among the nodes as a deactivated job. The image forming device may generate the first job list by classifying the activated job and the deactivated job.

In operation 250, the image forming device may perform a first image forming job selected from the first job list.

For example, the image forming device may display the first job list on the user interface device of the image forming device. The image forming device may receive an input of selecting a first job in the first job list through the user interface device. The image forming device may request an external device where the first job is stored for data related to the first job. The image forming device may receive the data related to the first job from the external device and perform the first job based on the received data.

For example, the image forming device may receive a first file related to the first job from a certain node in the network of the blockchain. The image forming device may output a first output of the first file by performing an image forming job on the first file.

Because job information of a user with respect to a certain image forming job is recorded on or stored in a ledger managed based on a blockchain, the job information of the user may be managed without having to use a separate server for storing the job information of the user.

Figure 3:
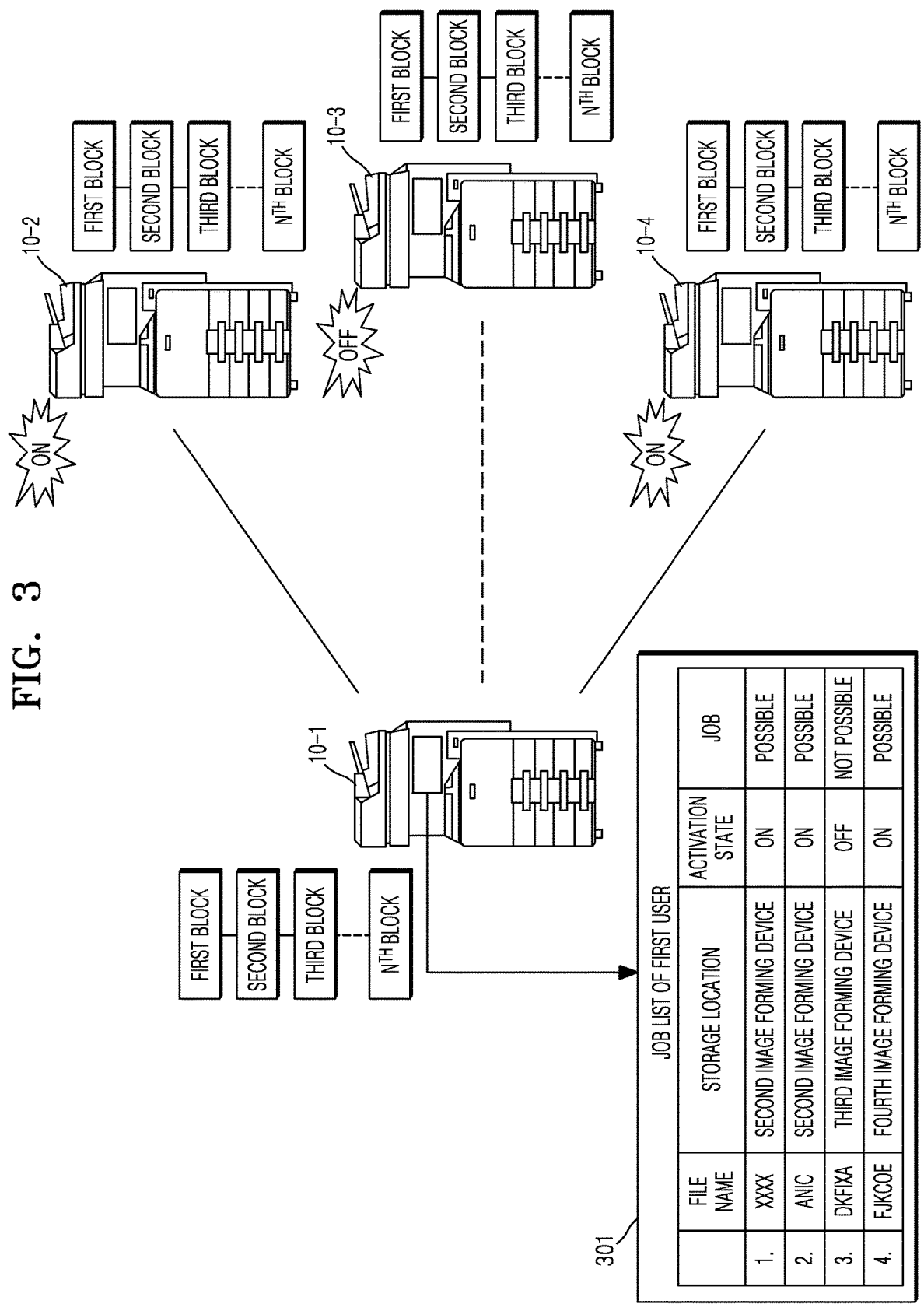
FIG. 3 is a diagram for describing processes of obtaining a job list of a certain user from a ledger managed based on a blockchain, according to an example.

FIG. 3 is a diagram for describing processes of obtaining a job list of a certain user from a ledger managed based on a blockchain, according to an example.

Referring to FIG. 3, the first user may access the first image forming device 10-1 by using the account of the first user. Here, the first image forming device 10-1 may possess a ledger in which job information of a user with respect to a certain image forming job is recorded based on a blockchain. The first image forming device 10-1 may receive a request to provide job information of the first user through the user interface device of the first image forming device 10-1.

The first image forming device 10-1 may extract the job information of the first user from the ledger. For example, the first image forming device 10-1 may extract, from the ledger, first job information related to a first file stored in the second image forming device 10-2, second job information related to a second file stored in the second image forming device 10-2, third job information related to a third file stored in the third image forming device 10-3, and fourth job information related to a fourth file stored in the fourth image forming device 10-4.

The first image forming device 10-1 may identify operation states of the second through fourth image forming devices 10-2 through 10-4. The first image forming device 10-1 may generate a job list of the first user, based on a result of identifying the operation states.

For example, the first image forming device 10-1 may generate the job list including information about a job file of the first user, an image forming device where the job file of the first user is stored, and an activation state of the image forming device. When the activation state of the image forming device is displayed, the first user is able to determine whether the first image forming device 10-1 is able to output a certain file.

As shown in FIG. 3, the second and fourth image forming devices 10-2 and 10-4 may be in power-on states and the third image forming device 10-3 may be in a power-off state. The first image forming device 10-1 may generate a job list 301 of the first user including information about a possibility of performing a job on a job file and display the job list 301 through the user interface device.

Figure 4:
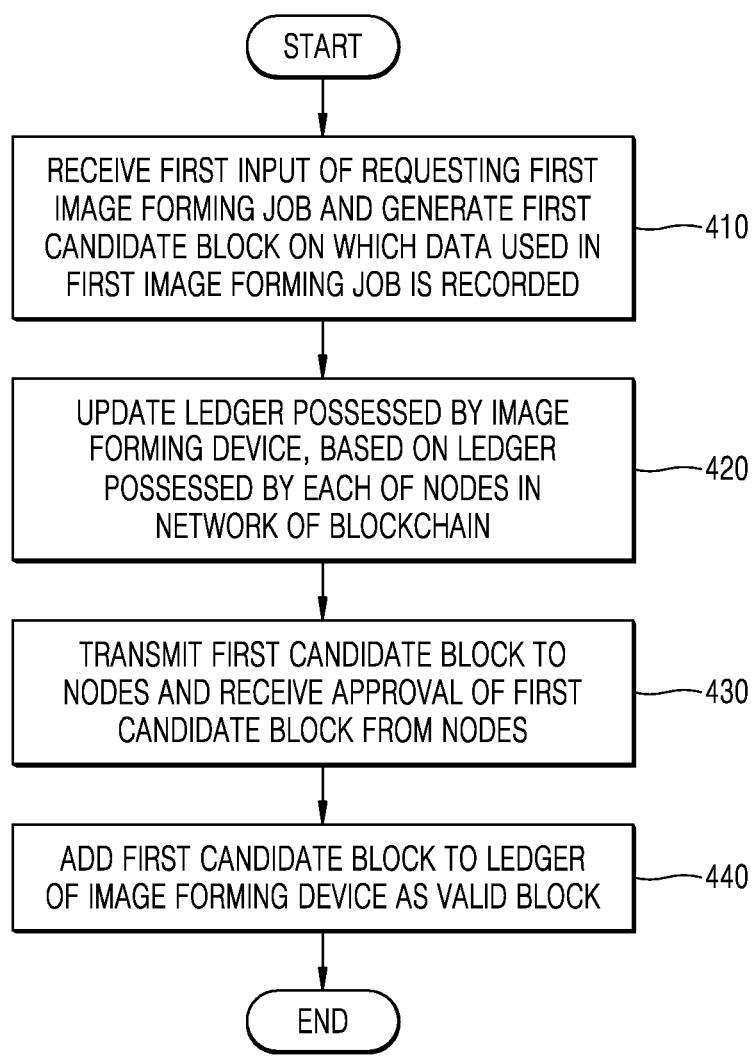
FIG. 4 is a flowchart of an operating method of an image forming device adding a block on which data used in a certain job is recorded to a ledger, according to an example.

FIG. 4 is a flowchart of an operating method of an image forming device adding a block on which data used in a certain job is recorded to a ledger, according to an example.

Referring to FIG. 4, the image forming device may receive a first input of requesting a first image forming job in operation 410. The image forming device may generate a first candidate block in which data used in the first image forming job is recorded.

For example, the first candidate block may include information of an ID of a first user, an ID of the first image forming job, a name of the first image forming job, a location where data related to the first image forming job is stored, a storage deadline of the data, or the like. By setting the storage deadline of the data, a phenomenon in which the size of a ledger is infinitely increasing may be prevented.

The image forming device may transmit all or a part of the data used in the first image forming job to at least one of nodes in a network of a blockchain. The image forming device may generate the first candidate block by recording location information indicating that a location where the data used in the first image forming job is an image forming device or at least one node.

Also, the image forming device may determine a second image forming job requested more than a certain number of times for a certain period from the nodes in the network of the blockchain. While a candidate block to be added to the ledger is generated, the image forming device may add data used in the second image forming job to the candidate block to be added. In other words, the image forming device may store a file related to a job frequently requested in a block. A user may perform a job frequently requested by a desired image forming device at a desired time.

In operation 420, the image forming device may update a ledger possessed by the image forming device, based on a ledger possessed by each of the nodes in the network of the blockchain.

The image forming device may identify whether the ledger possessed by the image forming device matches the ledger possessed by each of the nodes in the network of the blockchain. The image forming device may synchronize the ledger possessed by the image forming device with the ledgers possessed by the nodes, based on a result of the identification.

In operation 430, the image forming device may transmit the first candidate block to the nodes and receive an approval of the first candidate block from the nodes.

In operation 440, the image forming device may add the first candidate block to the ledger of the image forming device as a valid block.

Figure 5:
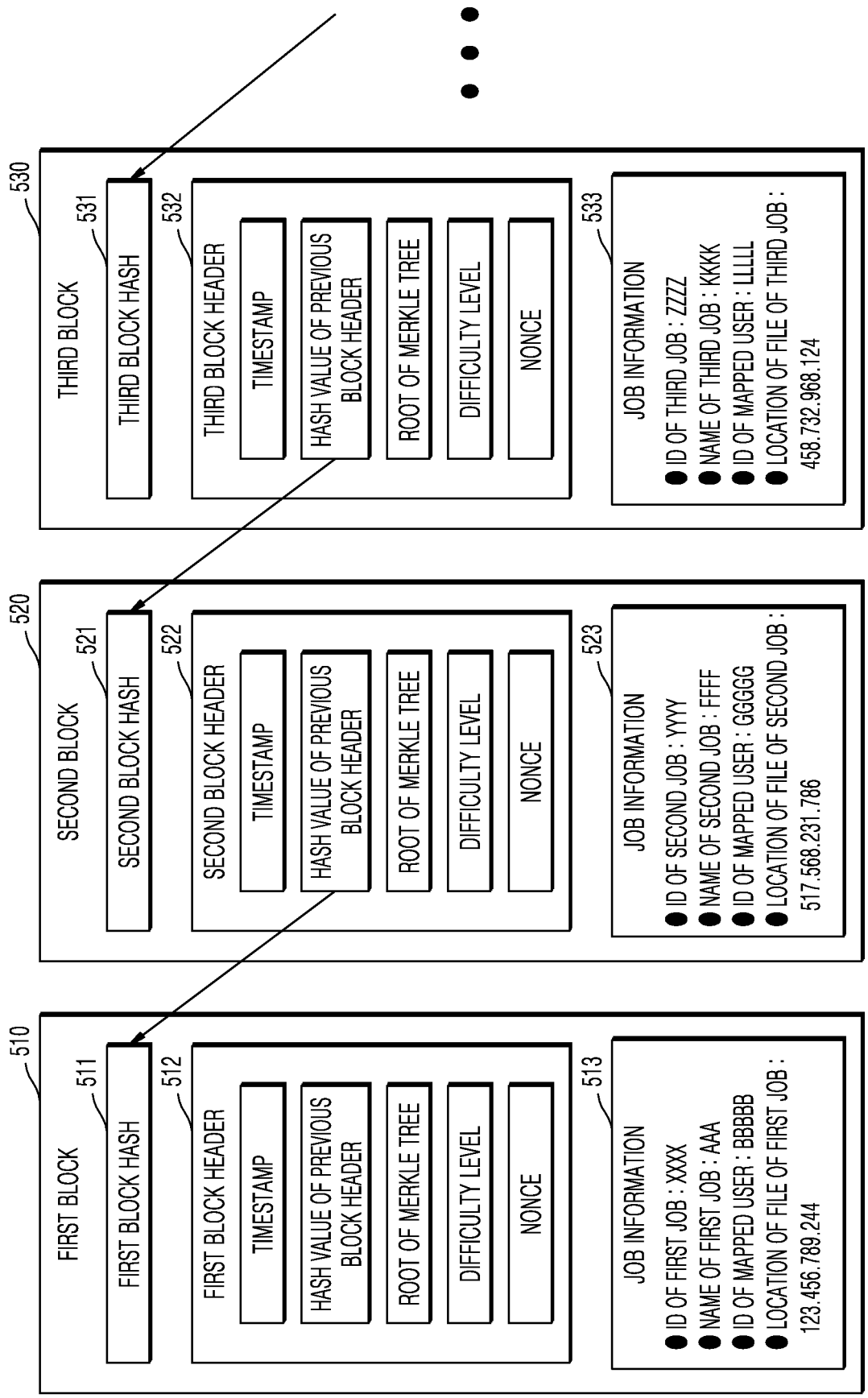
FIG. 5 is a diagram for describing structures of blocks on which job information is recorded and a blockchain in which the blocks are connected, according to an example.

FIG. 5 is a diagram for describing structures of blocks in which job information is recorded and a blockchain in which the blocks are connected, according to an example.

Referring to FIG. 5, a blockchain may be configured when blocks in which valid job information is recorded are connected to each other. A data structure of the blockchain may be a certain data structure in which blocks having job information recorded therein are configured in sequentially aligned units. Also, the data structure of the blockchain may include a data structure in which block headers are connected in a chain form by referring to a previous block header and a data structure of a Merkle tree in which a hash reference indicating data of job information and data of the job information are connected in a tree form.

A block may include a block hash, a block header, authentication information, and the like. The block header may include a timestamp, a hash value of a previous block header, a root of a Merkle tree, a difficulty level, and nonce information. Referring to FIG. 5, a blockchain of a certain node may be connected by a first block 510, a second block 520, and a third block 530. The first through third blocks 510 through 530 may respectively include a first hash 511, a second hash 521, and a third hash 531, a first block header 512, a second block header 522, and a third block header 532, and first job information 513, second job information 523, and third job information 533. The job information 513 of a first job may be recorded in the first block 510, the job information 523 of a second job may be recorded in the second block 520, and the job information 533 of a third job may be recorded in the third block 530. Job information may include information about an ID of a job, a name of the job, an ID of a user mapped to the job, a storage location of a file related to the job, or the like. The job information 513 through 533 of one job is recorded respectively on the first through third blocks 510 through 530, but job information of a plurality of jobs may be recorded thereon.

Referring to elements forming a block, a block hash may be a hash value of a hash function applied by using, as input values, a timestamp, a hash value of a previous block header, a root of a Merkle tree, a difficulty level, and nonce information. In other words, a value of the block hash is not a value obtained by hashing an entire block but by hashing a block header.

A hash value of a previous block header may be used to intrinsically identify each block header and refer to the previous block header. When each block header refers to a previous block header, an order of individual block headers and blocks may be maintained. Referring to FIG. 5, since the first block 510 is an initial block, there is no previous block and thus there is no reference indicating a previous block header. Accordingly, a hash value of a previous block header of the first block 510 is 0. Also, since a previous block of the second block 520 is the first block 510, a hash value of a previous block header of the second block 520 has the first block hash 511 of the first block header 512. Also, since a previous block of the third block 530 is the second block 520, a hash value of a previous block header of the third block 530 has the second block hash 521 of the second block header 522.

A Merkle tree may denote a structure in which data of a hash reference and job information are connected in a tree form. The hash reference may indicate the data of the job information by using an encryption hash value. In an example, since the encryption hash value is an intrinsic value of data, different pieces of data do not have a same hash value.

A timestamp may denote a time at which a job is started for job verification. A difficulty level may denote a constraint condition in a job verification or a hash puzzle. Nonce information may denote a value adjusted such that a value of a block hash satisfies a constraint condition for job verification.

Processes in which a first node possesses a blockchain including the first and second blocks 510 and 520 and the third block 530 to be added to the blockchain is generated will be described as an example. The first node may calculate a root of a Merkle tree with respect to the job information 533. The first node may generate a hash reference indicating a previous block header in terms of the third block 530 to be added to the blockchain. The first node may obtain a difficulty level required for job verification or constraint condition of the third block 530 to be added to the blockchain. The first node may identify whether a value of a block hash satisfies the constraint condition by applying the root of the Merkle tree, the hash reference indicating the previous block header, the difficulty level, data of a timestamp, and nonce information to a hash function. For example, the first node may perform job verification on a candidate block by obtaining a nonce value satisfying a constraint condition by increasing the nonce value by 1 from 0. Here, the candidate block may denote a block in a state before job verification is completed. The first node may add the candidate block to the blockchain as the valid third block 530. The first node may transmit the third block 530 to other nodes on a network of the blockchain.

Figure 6:
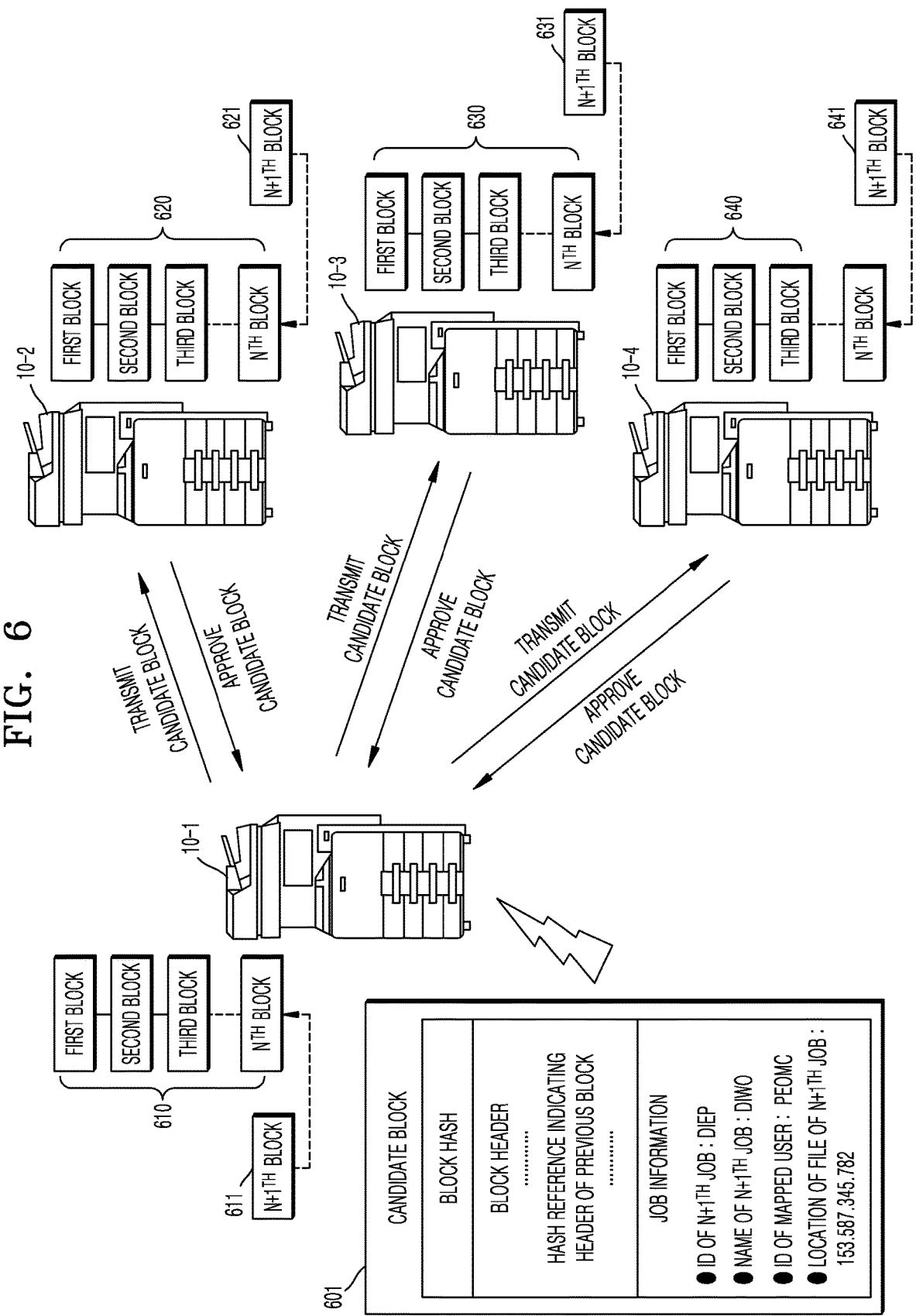
FIG. 6 is a diagram for describing processes of adding a block in which data used in a certain job is recorded to a ledger possessed by each node in a network of a blockchain, according to an example.

FIG. 6 is a diagram for describing processes of adding a block in which data used in a certain job is recorded to a ledger possessed by each node in a network of a blockchain, according to an example.

Referring to FIG. 6, the first image forming device 10-1 may receive a first input of requesting a first image forming job. The first image forming device 10-1 may generate a candidate block 601 in which data used in the first image forming job is recorded, based on the first input. For example, the first image forming device 10-1 may generate the candidate block 601 including job information including an ID of an $N+1^{th}$ job, a name of the $N+1^{th}$ job, an ID of a user mapped to the $N+1^{th}$ job, and a storage location of a file related to the $N+1^{th}$ job. The first image forming device 10-1 may transmit the candidate block 601 to the second through fourth image forming devices 10-2 through 10-4 in a network of a blockchain.

The second image forming device 10-2 may verify validity of the candidate block 601 received from the first image forming device 10-1. For example, the second image forming device 10-2 may verify the validity of the candidate block 601 by comparing a hash value of job information and a hash value of job information encrypted in a block. When the validity of the candidate block 601 is verified, the second image forming device 10-2 may transmit a message notifying approval of the candidate block 601 to the first image forming device 10-1.

In a similar manner, the third and fourth image forming devices 10-3 and 10-4 may verify the validity of the candidate block 601 received from the first image forming device 10-1. When the validity of the candidate block 601 is verified by the third and fourth image forming devices 10-3 and 10-4, the third and fourth image forming devices 10-3 and 10-4 may each transmit a message notifying approval of the candidate block 601.

When the first image forming device 10-1 receives a message notifying approval of the candidate block 601 from a majority of nodes among the nodes in the network of the blockchain, the first image forming device 10-1 may add the candidate block 601 as an $N+1^{th}$ block 611 to a ledger 610. The first image forming device 10-1 may add the candidate block 601 as a valid block to each of the second through fourth image forming devices 10-2 through 10-4 in the network of the blockchain.

The second image forming device 10-2 may add the candidate block 601 as an $N+1^{th}$ block 621 to a ledger 620 possessed by the second image forming device 10-2. The third image forming device 10-3 may add the candidate block 601 as an $N+1^{th}$ block 631 to a ledger 630 possessed by the third image forming device 10-3. Similarly, the fourth image forming device 10-4 may add the candidate block 601 as an $N+1^{th}$ block 641 to a ledger 640 possessed by the fourth image forming device 10-4.

Figure 7:
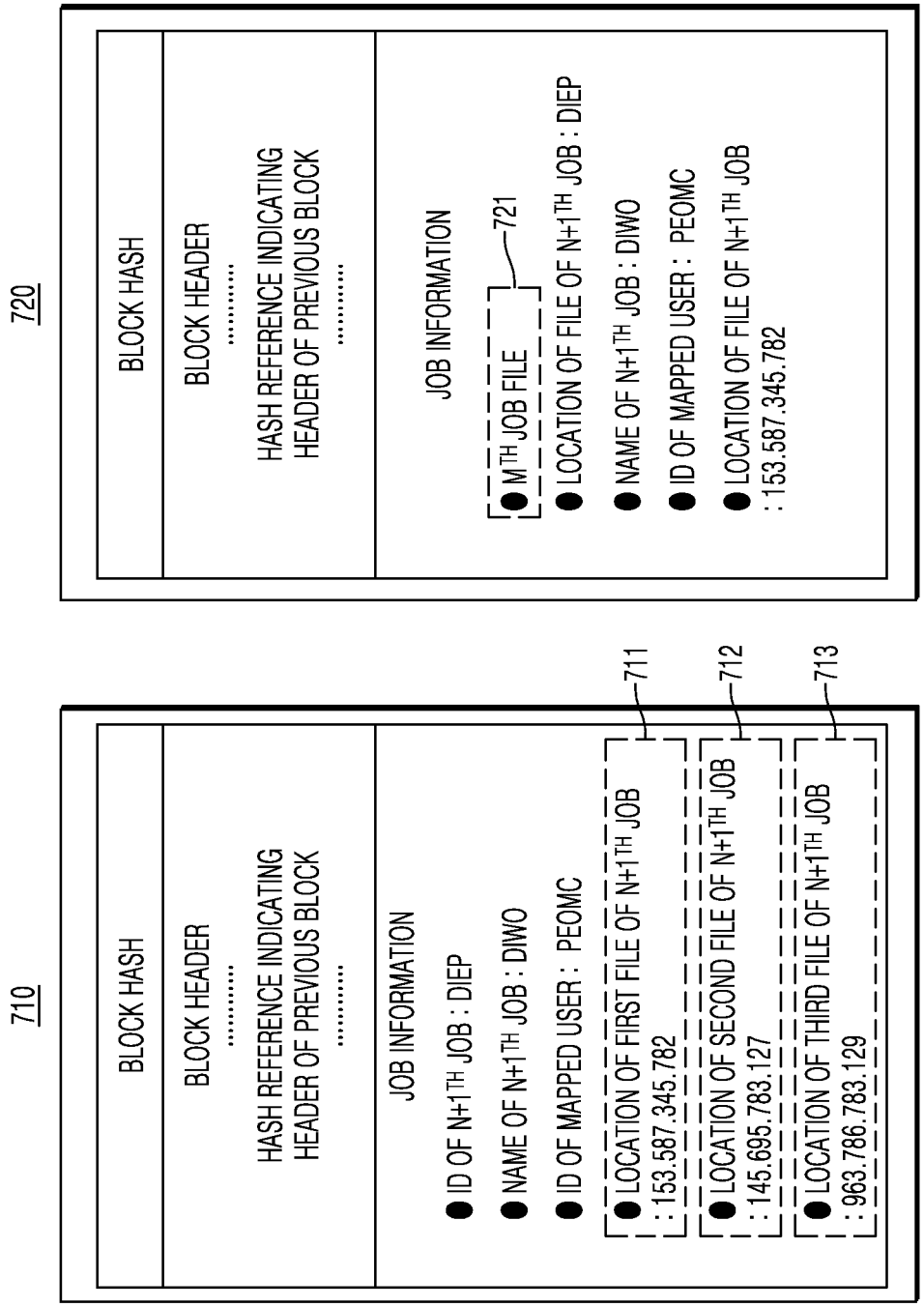
FIG. 7 is a diagram for describing various examples of blocks in which job information is recorded, according to an example.

FIG. 7 is a diagram for describing various examples of blocks in which job information is recorded, according to an example.

Referring to FIG. 7, an image forming device may receive data related to a first image forming job. For example, the image forming device may receive the data related to the first image forming job from an electronic device of a first user. The image forming device may store the data related to the first image forming job in a storage of the image forming device. For example, the data related to the first image forming job may be a file used for a certain image forming job.

When the capacity of the data related to the first image forming job exceeds a certain capacity, the image forming device may distribute and store the data related to the first image forming job in at least one of nodes in a network of a blockchain. The image forming device may transmit all or a part of data used in the first image forming job to at least one of the nodes in the network of the blockchain. The image forming device may split the data used in the first image forming job to data having certain sizes and assign the split data to a certain node. The image forming device may transmit the split data to the assigned certain node. Each node may store the received data in a storage of the node. The image forming device may distribute and store the data used in the first image forming job so as to prevent overload of a storage space in the storage of the image forming device.

The image forming device may generate a candidate block in which the data used in the first image forming job is recorded. Upon receiving an approval of the candidate block from the nodes in the network of the blockchain, the image forming device may add the candidate block to a ledger as a valid block.

For example, referring to a block 710 of FIG. 7, job information related to an $N+1^{th}$ job may be recorded in the block 710. The job information related to the $N+1^{th}$ job may include an ID of the $N+1^{th}$ job, a name of the $N+1^{th}$ job, an ID of a user mapped to the $N+1^{th}$ job, and a storage location of a file related to the $N+1^{th}$ job. When the file related to the $N+1^{th}$ job is distributed and stored in the nodes in the network of the blockchain, location information 711, 712, and 713 of where files of the $N+1^{th}$ job are stored may be recorded in the block 710.

As an example, the image forming device may determine a second image forming job requested more than a certain number of times for a certain period from the nodes in the network of the blockchain. While a candidate block to be added to a ledger is generated, the image forming device may add data used in the second image forming job. Upon receiving an approval of the candidate block from the nodes in the network of the blockchain, the image forming device may add the candidate block to the ledger as a valid block.

For example, referring to a block 720 of FIG. 7, the job information related to the $N+1^{th}$ job and an $M^{th}$ job file 721 may be stored in the block 720. A user may output the $M^{th}$ job file 721 stored in the block 720 from a desired node at a desired time.

Figure 8:
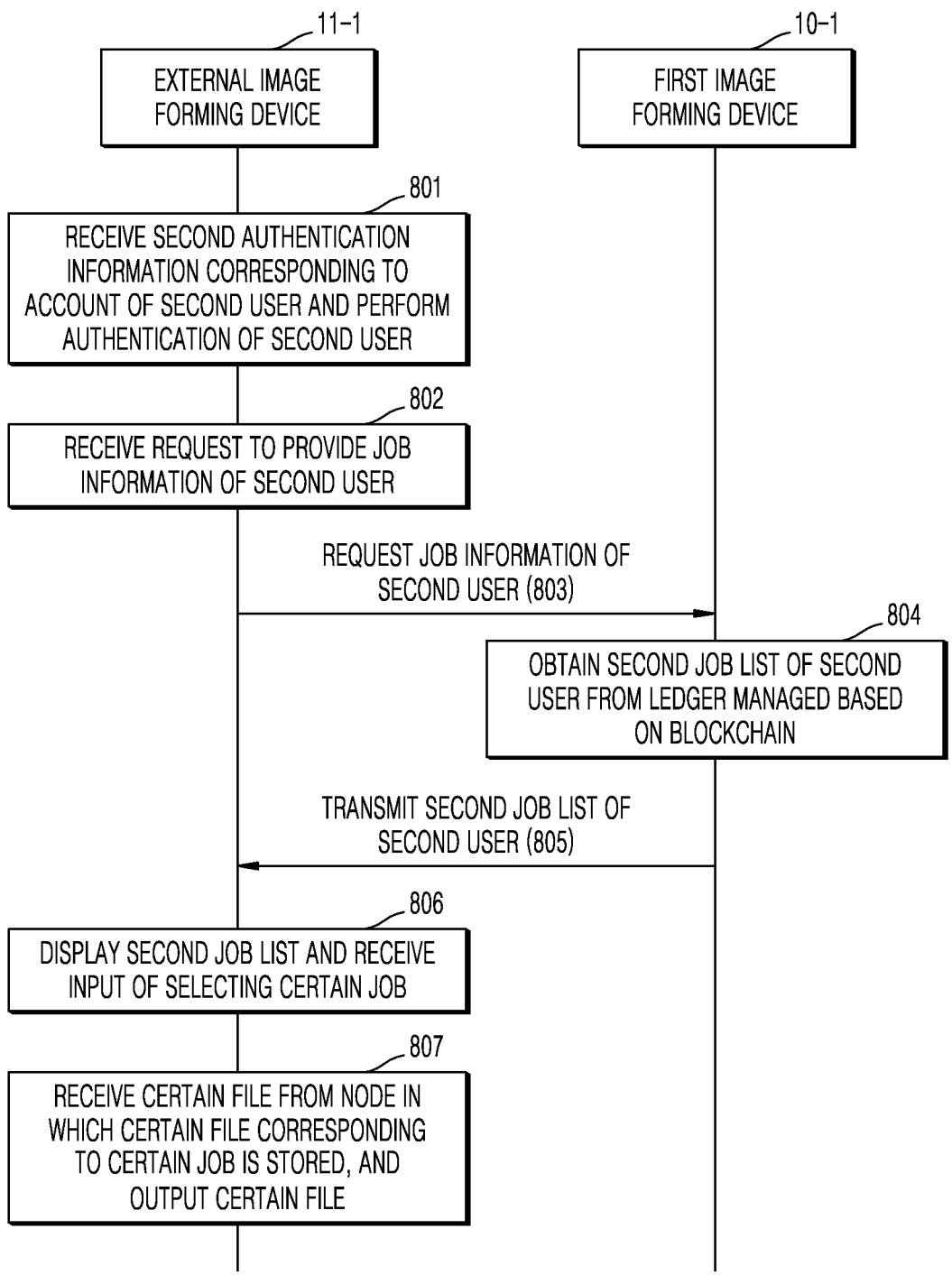
FIG. 8 is a flow diagram for describing processes of an external image forming device obtaining job information of a user based on a blockchain and performing a certain job, according to an example.

FIG. 8 is a flow diagram for describing processes of an external image forming device obtaining job information of a user based on a blockchain and performing a certain job, according to an example.

Referring to FIG. 8, the external image forming device 11-1 may receive second authentication information corresponding to an account of a second user in operation 801. The external image forming device 11-1 may authenticate the account of the second user according to the second authentication information.

In operation 802, the external image forming device 11-1 may receive a request to provide job information of the second user. In operation 803, the external image forming device 11-1 may request the first image forming device 10-1 in a network of a blockchain for the job information of the second user. For example, the external image forming device 11-1 may be an image forming device outside the network of the blockchain and may not possess a ledger based on the blockchain.

In operation 804, the first image forming device 10-1 may obtain a second job list of the second user from a ledger managed based on the blockchain. For example, the first image forming device 10-1 may obtain the job information of the second user from the ledger. The first image forming device 10-1 may identify operation states of nodes in which data related to the job information of the second user is stored, from among the nodes in the network of the blockchain. Based on a result of the identification, the first image forming device 10-1 may generate the second job list indicating a list of activated jobs among jobs of the second user.

In operation 805, the first image forming device 10-1 may transmit the second job list of the second user to the external image forming device 11-1.

In operation 806, the external image forming device 11-1 may display the second job list of the second user. The external image forming device 11-1 may receive an input of selecting a certain job.

In operation 807, the external image forming device 11-1 may receive a certain file from a node in which the certain file corresponding to the certain job is stored. The external image forming device 11-1 may output an output corresponding to the certain file.

Figure 9:
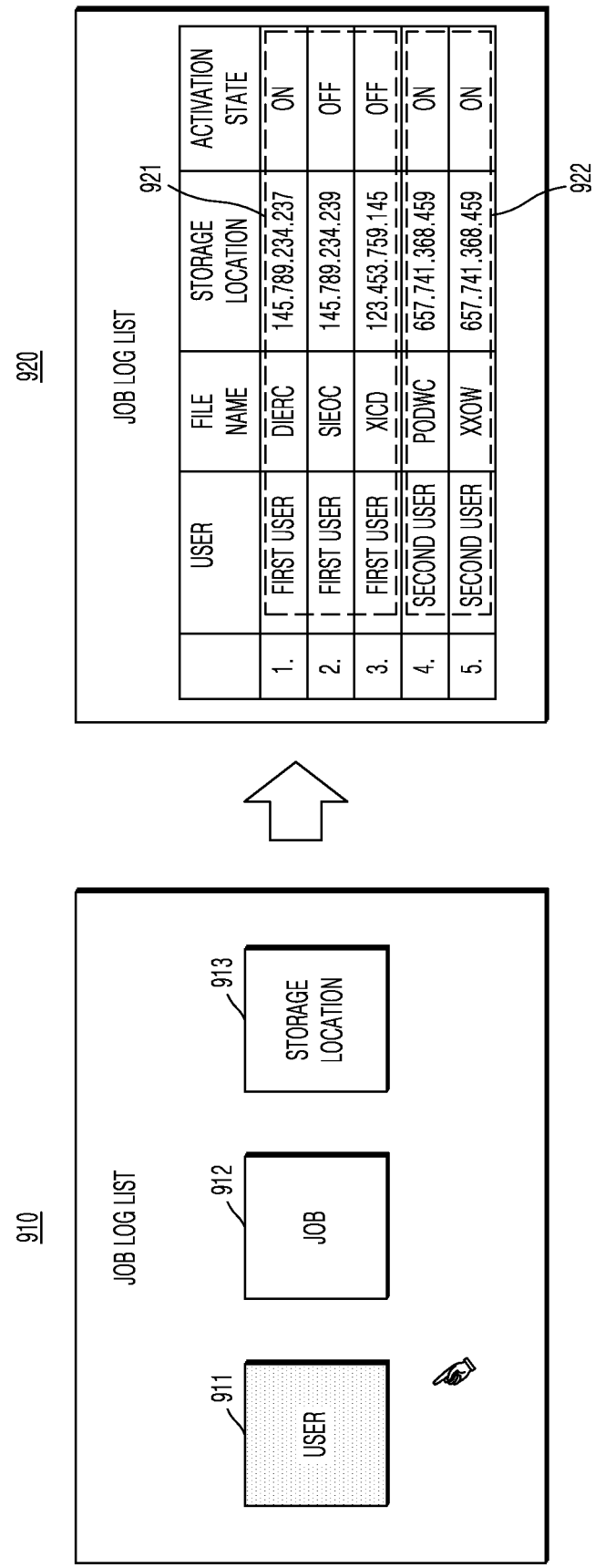
FIG. 9 is a diagram for describing an execution screen of an administrator displayed on an image forming device, according to an example.

FIG. 9 is a diagram for describing an execution screen of an administrator displayed on an image forming device, according to an example.

Referring to FIG. 9, the administrator who manages the image forming device may access the image forming device via an account of the administrator. When the account of the administrator is authenticated in the image forming device according to authentication information of the administrator, the image forming device may prepare operations of the image forming device according to authority of the administrator.

For example, the image forming device may display an execution screen 910 of setting a job log list with respect to a plurality of users. The job log list may be a list of pieces of job information registered by the plurality of users using the image forming device. As an example, the image forming device may obtain the job log list based on a certain category. The certain category may be a user 911, a type of job 912, or a storage location 913 where data is stored. In an example, the image forming device may receive an input of selecting a category of the user 911 among the certain categories.

The image forming device may generate a job log list 920 including job information related to jobs stored in nodes, according to users. For example, the job information may include an ID of a user, a file name, a location of a node where a file is stored, and an activated state of a node where a file is stored. As shown in FIG. 9, the image forming device may distinguishably display a storage location 921 of a job log list of a first user and a storage location 922 of a job log list of a second user.

The administrator may identify all job logs of the plurality of users from the image forming device, and thus may not have to separately make an inquiry into a job log from another image forming device.

Figure 10:
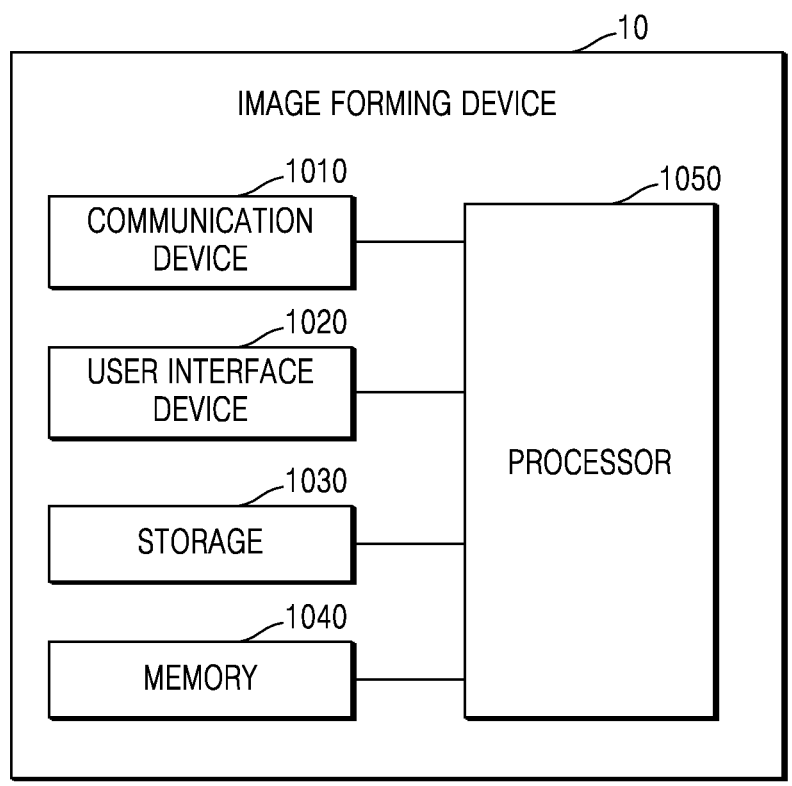
FIG. 10 is a block diagram of a configuration of an image forming device, according to an example.

FIG. 10 is a block diagram of a configuration of an image forming device, according to an example.

Referring to FIG. 10, an image forming device 10 may include a communication device 1010, a user interface device 1020, a storage 1030, a memory 1040, and a processor 1050. The image forming device 10 may include more or fewer components than those shown in FIG. 10.

The communication device 1010 may communicate with an external device. As an example, the communication device 1010 may communicate with the external device by being connected to a network via wires or wirelessly. Here, the external device may be a node that distributes and manages a ledger based on a blockchain.

The communication device 1010 may include a communication module (e.g., a transceiver) supporting one of various wired and wireless communication methods. For example, the communication module may be in a form of a chipset or may be a sticker/barcode (for example, a sticker including a near field communication (NFC) tag) containing information necessary for communication. The communication module may be a short distance communication module or a wired communication module.

The communication device 1010 may support, for example, wireless local area network (LAN), wireless fidelity (Wi-Fi), Wi-Fi direct, Bluetooth, universal serial bus (USB), wired LAN, NFC, or the like.

The user interface device 1020 may include an input device for receiving an input for performing an image forming job or the like from a user, and an output device for displaying information, such as a result of performing an image forming job or a state of the image forming device 10. For example, the user interface device 1020 may include a manipulation panel for receiving a user input, a display panel for displaying a screen, etc.

As an example, the input device may include a device for receiving various types of user inputs, for example, a keyboard, a physical button, a touch screen, a camera, a microphone, or the like. Also, the output device may include, for example, a display panel, a speaker, or the like. However, the user interface device 1020 is not limited thereto, and the user interface device 1020 may include a device supporting various inputs and outputs.

The storage 1030 may store information related to authentication information and job information of a plurality of users. For example, the storage 1030 may store job information related to a new job to be added to a ledger by a certain user. As an example, the job information related to the new job may include an ID of a job, a file related to the job, a storage deadline of the file related to the job, or the like.

The memory 1040 may store a program, data, or a file related to the image forming device 10. The processor 1050 may execute a program stored in the memory 1040, read data or file stored in the memory 1040, or store a new file in the memory 1040. The memory 1040 may store a program command, a data file, a data structure, or the like independently or in a combination. The memory 1040 may store instructions executable by the processor 1050.

The processor 1050 controls overall operations of the image forming device 10, and may include at least one processor, such as a central processing unit (CPU). Also, the processor 1050 may control other components included in the image forming device 10 such that an operation corresponding to a user input received through the user interface device 1020 is performed. Also, the processor 1050 may include at least one specialized processor corresponding to each function or may include one integrated processor.

The processor 1050 may receive first authentication information corresponding to an account of a first user through the user interface device 1020.

When the image forming device 10 authenticates the account of the first user according to the first authentication information, the processor 1050 may prepare operations of the image forming device 10 according to usage authorization of the first user.

The processor 1050 may obtain a request to provide job information of the first user. For example, the processor 1050 may receive an input of requesting the job information of the first user recorded on a ledger of a blockchain, through the user interface device 1020 of the image forming device 10.

The processor 1050 may obtain a first job list of the first user from the ledger, based on the blockchain in which the ledger is distributed and managed, wherein job information of a user with respect to a certain image forming job is recorded on the ledger.

As an example, the processor 1050 may obtain the job information of the first user from the ledger. The processor 1050 may identify operation states of nodes in which data related to the job information of the first user is stored, from among nodes in a network of the blockchain, through the communication device 1010. For example, the processor 1050 may transmit a certain signal to the nodes through the communication device 1010. Upon receiving a response signal with respect to the certain signal from a second node, the processor 1050 may determine that the second node is in a power-on state. On the other hand, when the response signal with respect to the certain signal is not received from the second node, the processor 1050 may determine that the second node is in a power-off state. The processor 1050 may generate a first job list indicating a list of activated jobs, based on a result of the identification.

For example, the processor 1050 may determine a job stored in a node in a power-on state among the nodes as an activated job. The processor 1050 may determine a job stored in a node in a power-off state among the nodes as a deactivated job. The processor 1050 may generate the first job list by classifying the activated job and the deactivated job.

The processor 1050 may perform a first image forming job selected from the first job list.

For example, the processor 1050 may display the first job list through the user interface device 1020. The processor 1050 may receive an input of selecting a first job in the first job list through the user interface device 1020. The processor 1050 may request an external device where a first job is stored for data related to the first job, through the communication device 1010. The processor 1050 may receive the data related to the first job from the external device through the communication device 1010. The processor 1050 may perform the first job based on the received data.

For example, the processor 1050 may receive a first file related to the first job from a certain node in the network of the blockchain, through the communication device 1010. The processor 1050 may output a first output of the first file by performing an image forming job on the first file.

The processor 1050 may receive a first input of requesting the first image forming job through the user interface device 1020. The processor 1050 may generate a first candidate block in which data used in the first image forming job is recorded.

For example, at least one of an ID of the first user, an ID of the first image forming job, a name of the first image forming job, a location where data related to the first image forming job is stored, a deadline of the data, or the like may be recorded on the first candidate block.

In an example, the processor 1050 may transmit all or a part of the data used in the first image forming job to at least one node in the network of the blockchain, through the communication device 1010. The processor 1050 may generate the first candidate block by recording location information indicating that the location where the data used in the first image forming job is stored is the image forming device 10 and the at least one node.

Also, the processor 1050 may determine a second image forming job requested more than a certain number of times for a certain period from the nodes in the network of the blockchain. While generating a candidate block to be added to the ledger, the processor 1050 may add data used in the second image forming job to the candidate block to be added.

The processor 1050 may update a ledger possessed by the image forming device 10, based on a ledger possessed by each of the nodes in the network of the blockchain.

The processor 1050 may identify whether the ledger possessed by the image forming device 10 matches the ledger possessed by each of the nodes in the network of the blockchain. The processor 1050 may synchronize the ledger possessed by the image forming device 10 and the ledgers possessed by the nodes, based on a result of the identification.

The processor 1050 may transmit a first candidate block to the nodes and receive an approval of the first candidate block from the nodes, through the communication device 1010.

The processor 1050 may add the first candidate block to the ledger possessed by the image forming device 10 as a valid block.

The processor 1050 may receive a request to provide job information of a second user from an external image forming device, instead of the nodes in the network of the blockchain, through the communication device 1010. The processor 1050 may obtain the job information of the second user from the ledger. The processor 1050 may identify operation states of nodes in which data related to the job information of the second user is stored, from among the nodes. The processor 1050 may generate a second job list indicating a list of activated jobs among jobs of the second user, based on a result of the identification. The processor 1050 may transmit the second job list of the second user to the external image forming device, through the communication device 1010.

Also, the processor 1050 may receive authentication information of an administrator who manages the image forming device 10, through the user interface device 1020. When the image forming device 10 authenticates an account of the administrator according to the authentication information of the administrator, the processor 1050 may prepare operations of the image forming device 10 according to an authority of the administrator. For example, the processor 1050 may display an execution screen enabling the administrator to search a job log list of a plurality of users, through the user interface device 1020. The processor 1050 may obtain a job log list in which job information registered by the plurality of users is recorded, from the ledger. The processor 1050 may display the job log list through the user interface device 1020.

An operating method as described above may be embodied in a form of a non-transitory computer-readable recording medium storing computer- or processor-executable instructions or data. The examples of the disclosure may be written as computer programs and can be implemented in general-use digital computers that execute the programs using a computer-readable recording medium. Examples of the computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tape, a floppy disk, a magneto-optical data storage device, an optical data storage device, a hard disk, a solid-state disk (SSD), and any device capable of storing instructions or software, related data, a data file, and data structures and providing the instructions or software, the related data, the data file, and the data structures to a processor or a computer such that the processor or the computer may execute the instructions.

Examples have been described above, but it will be understood by one of ordinary skill in the art that various changes and modifications may be made therein. For example, appropriate results may be achieved even when technologies described above may be performed in a different order and/or components of a system, structure, apparatus, circuit, or the like are connected or combined in a different manner or are replaced by other components or equivalents.

Accordingly, the scope of the disclosure should not be limited by the examples described above but shall be defined by not only the following claims, but also equivalents.

What is claimed is:

1. An operating method of an image forming device, the operating method comprising:
   receiving first authentication information corresponding to an account of a first user;
   when the account of the first user is authenticated according to the first authentication information, preparing an operation of the image forming device according to usage authorization of the first user;
   receiving a request to provide job information of the first user;
   obtaining a first job list of the first user from a ledger in which job information of a user with respect to a certain image forming job is recorded, based on a blockchain in which the ledger is distributed and managed; and
   performing a first image forming job selected from the first job list.

2. The operating method of claim 1, wherein the obtaining of the first job list comprises:
   obtaining the job information of the first user from the ledger;
   identifying operation states of nodes where data related to the job information of the first user is stored, from among nodes in a network of the blockchain; and
   generating the first job list indicating a list of activated jobs, based on a result of the identifying.

3. The operating method of claim 2, wherein the generating of the first job list indicating the list of activated jobs, based on the result of the identifying, comprises:
   determining a job stored in a node in a power-on state from among the nodes as an activated job;
   determining a job stored in a node in a power-off state from among the nodes as a deactivated job; and
   generating the first job list by classifying the activated job and the deactivated job.

4. The operating method of claim 1, further comprising:
   receiving a first input of requesting the first image forming job and generating a first candidate block in which data used in the first image forming job is recorded;
   updating a ledger possessed by the image forming device, based on a ledger possessed by each of nodes in a network of the blockchain;
   transmitting the first candidate block to the nodes and receiving an approval of the first candidate block from the nodes; and
   adding the first candidate block to the ledger of the image forming device as a valid block.

5. The operating method of claim 4, wherein information of an identification (ID) of the first user, an ID of the first image forming job, a name of the first image forming job, a location where data related to the first image forming job is stored, or a storage deadline of the data is recorded on the first candidate block.

6. The operating method of claim 4, wherein the generating of the first candidate block comprises:
   transmitting all or part of the data used in the first image forming job to at least one node in the network of the blockchain; and
   generating the first candidate block by recording location information indicating that a location where the data used in the first image forming job is stored is the image forming device and the at least one node.

7. The operating method of claim 4, wherein the updating of the ledger possessed by the image forming job comprises:
   identifying whether the ledger possessed by the image forming device matches the ledger possessed by each of the nodes in the network of the blockchain; and
   synchronizing the ledger possessed by the image forming device with the ledger possessed by each of the nodes, based on a result of the identifying.

8. The operating method of claim 1, further comprising:
   determining a second image forming job requested more than a certain number of times for a certain period, from nodes in a network of the blockchain; and
   while generating a candidate block to be added to the ledger, adding data used in the second image forming job to the candidate block to be added.

9. The operating method of claim 1, further comprising:
   receiving a request to provide job information of a second user from an external image forming device, not from nodes in a network of the blockchain;
   obtaining a second job list of the second user from the ledger; and
   transmitting the second job list to the external image forming device.

10. The operating method of claim 1, wherein, when the first user is an administrator who manages the image forming device, the obtaining of the first job list of the first user from the ledger based on the blockchain comprises obtaining, from the ledger, a job log list in which job information registered by a plurality of users who use the image forming device is recorded.

11. A non-transitory computer program stored in a medium, to be executed by being combined with an image forming device, the computer program comprising:
   instructions to receive first authentication information corresponding to an account of a first user;
   instructions to, when the account of the first user is authenticated according to the first authentication information, prepare an operation of the image forming device according to usage authorization of the first user;
   instructions to receive a request to provide job information of the first user;
   instructions to obtain a first job list of the first user from a ledger in which job information of a user with respect to a certain image forming job is recorded, based on a blockchain in which the ledger is distributed and managed; and instructions to perform a first image forming job selected from the first job list.

12. An image forming device comprising:
a communication device;
a user interface device;
a storage;
a processor; and
a memory storing instructions executable by the processor, wherein the processor is to execute the instructions to:
receive first authentication information corresponding to an account of a first user;
when the account of the first user is authenticated according to the first authentication information, prepare an operation of the image forming device according to usage authorization of the first user;
receive a request to provide job information of the first user;
obtain a first job list of the first user from a ledger on which job information of a user with respect to a certain image forming job is recorded, based on a blockchain in which the ledger is distributed and managed; and
perform a first image forming job selected from the first job list.

13. The image forming device of claim 12, wherein the processor is to execute the instructions to:
obtain job information of the first user from the ledger;
identify operation states of nodes in which data related to the job information of the first user is stored, from among nodes in a network of the blockchain; and
generate the first job list indicating a list of activated jobs, based on a result of the identification.

14. The image forming device of claim 12, wherein the processor is to execute the instructions to:
receive a first input of requesting the first image forming job and generate a first candidate block on which the data used in the first image forming job is recorded;
update a ledger possessed by the image forming device, based on a ledger possessed by each of nodes in a network of the blockchain;
transmit the first candidate block to the nodes and receive an approval of the first candidate block from the nodes; and
add the first candidate block to the ledger possessed by the image forming device as a valid block.

15. The image forming device of claim 12, wherein the processor is to execute the instructions to:
determine a second image forming job requested more than a certain number of times for a certain period, from nodes in a network of the blockchain; and
while generating a candidate block to be added to the ledger, add data used in the second image forming job to the candidate block to be added.

* * * * *